(12) United States Patent
Das

(10) Patent No.: US 11,281,607 B2
(45) Date of Patent: Mar. 22, 2022

(54) PARAVIRTUALIZED CLUSTER MODE FOR LEGACY APICS

(71) Applicant: Red Hat, Inc., Raleigh, NC (US)

(72) Inventor: Bandan Das, Westford, MA (US)

(73) Assignee: RED HAT, INC., Raleigh, NC (US)

( * ) Notice: Subject to any disclaimer, the term of this patent is extended or adjusted under 35 U.S.C. 154(b) by 0 days.

(21) Appl. No.: 16/777,366

(22) Filed: Jan. 30, 2020

(65) Prior Publication Data

US 2021/0240644 A1 Aug. 5, 2021

(51) Int. Cl.
*G06F 13/24* (2006.01)
*G06F 9/455* (2018.01)

(52) U.S. Cl.
CPC .......... *G06F 13/24* (2013.01); *G06F 9/45558* (2013.01); *G06F 2009/45579* (2013.01)

(58) Field of Classification Search
CPC .................. G06F 13/24; G06F 9/45558; G06F 2009/45579
See application file for complete search history.

(56) References Cited

U.S. PATENT DOCUMENTS

| | | | |
|---|---|---|---|
| 7,984,108 B2 | 7/2011 | Landis et al. | |
| 9,183,026 B2 | 11/2015 | Wang et al. | |
| 9,355,040 B2 | 5/2016 | Gschwind | |
| 2003/0061423 A1* | 3/2003 | Rankin | G06F 13/24 710/260 |
| 2007/0282572 A1* | 12/2007 | Larus | G06F 9/5077 703/2 |
| 2008/0244222 A1* | 10/2008 | Supalov | G06F 9/5077 712/13 |
| 2009/0083263 A1* | 3/2009 | Felch | G06F 9/5077 |
| 2009/0313446 A1* | 12/2009 | Schuba | G06F 12/0284 711/162 |
| 2011/0197004 A1 | 8/2011 | Serebrin et al. | |

(Continued)

FOREIGN PATENT DOCUMENTS

CN 103761145 B 6/2017

OTHER PUBLICATIONS

Agesen, Ole; Software Techniques for Avoiding Hardware Virtualization Exits, Published 2012, 13 pages, http://www.cs.columbia.edu/~cdall/candidacy/pdf/Agesen2012.pdf.

(Continued)

*Primary Examiner* — Henry Tsai
*Assistant Examiner* — Aurangzeb Hassan
(74) *Attorney, Agent, or Firm* — Haynes and Boone, LLP

(57) ABSTRACT

According to one example, a method includes, with a hypervisor, advertising a paravirtualized cluster mode for a guest using a legacy Advanced Programmable Interrupt Controller (APIC), the paravirtualized cluster mode allowing for interrupts using logical destination mode on a virtual machine having a plurality of virtual cores that is greater than eight. The method further includes, associating each of the plurality of virtual cores with an N-bit identifier formatted to be one of $2^N$ different values. The method further includes, with the hypervisor, in response to receiving an interrupt for the virtual machine, determining to which of the plurality of virtual cores the interrupt should be sent based on at least a subset of bits in a destination address of the interrupt.

20 Claims, 5 Drawing Sheets

(56) References Cited

U.S. PATENT DOCUMENTS

| | | | |
|---|---|---|---|
| 2012/0079480 A1* | 3/2012 | Liu | G06F 11/3466 |
| | | | 718/1 |
| 2013/0339794 A1* | 12/2013 | Nandam | G06F 11/2284 |
| | | | 714/36 |
| 2014/0068600 A1* | 3/2014 | Ashok | G06F 9/5077 |
| | | | 718/1 |
| 2014/0075029 A1* | 3/2014 | Lipchuk | G06F 9/5077 |
| | | | 709/226 |
| 2014/0208077 A1* | 7/2014 | Bradbury | G06F 9/30032 |
| | | | 712/222 |
| 2014/0223060 A1* | 8/2014 | Tsirkin | G06F 13/24 |
| | | | 710/261 |
| 2015/0277949 A1* | 10/2015 | Loh | G06F 12/145 |
| | | | 711/152 |
| 2015/0319160 A1* | 11/2015 | Ferguson | G06F 9/45558 |
| | | | 726/10 |
| 2017/0083381 A1* | 3/2017 | Cong | G06F 9/5077 |
| 2018/0004969 A1* | 1/2018 | Getson | G06F 21/6218 |
| 2018/0048532 A1* | 2/2018 | Poort | H04L 41/147 |
| 2020/0034168 A1* | 1/2020 | Singleton, IV | G06F 9/5044 |
| 2020/0174817 A1* | 6/2020 | Ding | G06F 9/5077 |
| 2020/0389372 A1* | 12/2020 | Tian | H04L 65/40 |
| 2021/0132944 A1* | 5/2021 | Quinn | G06F 12/023 |

OTHER PUBLICATIONS

Du, Jiaqing; Performance Profiling in a Virtualized Environment, 6 pages https://www.usenix.org/legacy/event/hotcloud10/tech/full papers/Du.pdf.

\* cited by examiner

PARAVIRTUALIZED CLUSTER MODE FOR LEGACY APICS

BACKGROUND

The present disclosure relates generally to virtual systems, and more particularly, to a paravirtualized cluster mode for virtual computing systems.

A virtual machine is a piece of software that, when executed on appropriate hardware, creates an environment allowing the virtualization of an actual physical computer system. Each virtual machine running on the physical system may function as a self-contained platform, running its own operating system (OS) and software applications (processes) on one or more virtual processors.

A host machine (e.g., computer or server) is typically enabled to simultaneously run one or more virtual machines using a hypervisor. The host machine allocates a certain amount of the host's resources, such as the host's underlying physical processors and memory devices, to each of the virtual processors. This allocation by the hypervisor allows guests of the virtual machines to transparently access the host machine's resources. Each virtual machine may use the allocated resources to execute applications, including operating systems known as guest operating systems. Local or remote clients may access these guest applications to perform computing tasks. It is desirable to improve the manner in which virtual machines are managed.

SUMMARY

A method includes, with a hypervisor, advertising a paravirtualized cluster mode for a guest using a legacy Advanced Programmable Interrupt Controller (APIC), the paravirtualized cluster mode allowing for interrupts using logical destination mode on a virtual machine having a plurality of virtual cores that is greater than eight. The method further includes associating each of the plurality of virtual cores with an N-bit identifier formatted to be one of $2^N$ different values. The method further includes, with the hypervisor, in response to receiving an interrupt for the virtual machine, determining to which of the plurality of virtual cores the interrupt should be sent based on at least a subset of bits in a destination address of the interrupt.

A method includes, with a guest that uses a legacy Advanced Programmable Interrupt Controller (APIC), determining whether a hypervisor supports a paravirtualized cluster mode, the paravirtualized cluster mode allowing for interrupts using logical destination mode on a virtual machine having a plurality of virtual cores that is greater than eight. The method further includes, with the guest, enabling the paravirtualized cluster mode. The method further includes associating each of the plurality of virtual cores with an N-bit identifier formatted to be one of $2^N$ different values. The method further includes, with the guest, setting N bits in a logical destination register to indicate the N-bit identifier associated with a virtual core of the plurality of virtual cores.

A computing system includes a processor and a memory with machine readable instructions that when executed by the processor, cause the system to advertise a paravirtualized cluster mode for a guest using a legacy Advanced Programmable Interrupt Controller (APIC), the paravirtualized cluster mode allowing for interrupts using logical destination mode on a virtual machine having a plurality of virtual cores that is greater than eight. The system is further to associate each of the plurality of virtual cores with an N-bit identifier formatted to be one of $2^N$ different values and in response to receiving an interrupt for the virtual machine, determine to which of the plurality of virtual cores the interrupt should be sent based on at least a subset of bits in a destination address of the interrupt.

Figure 1:
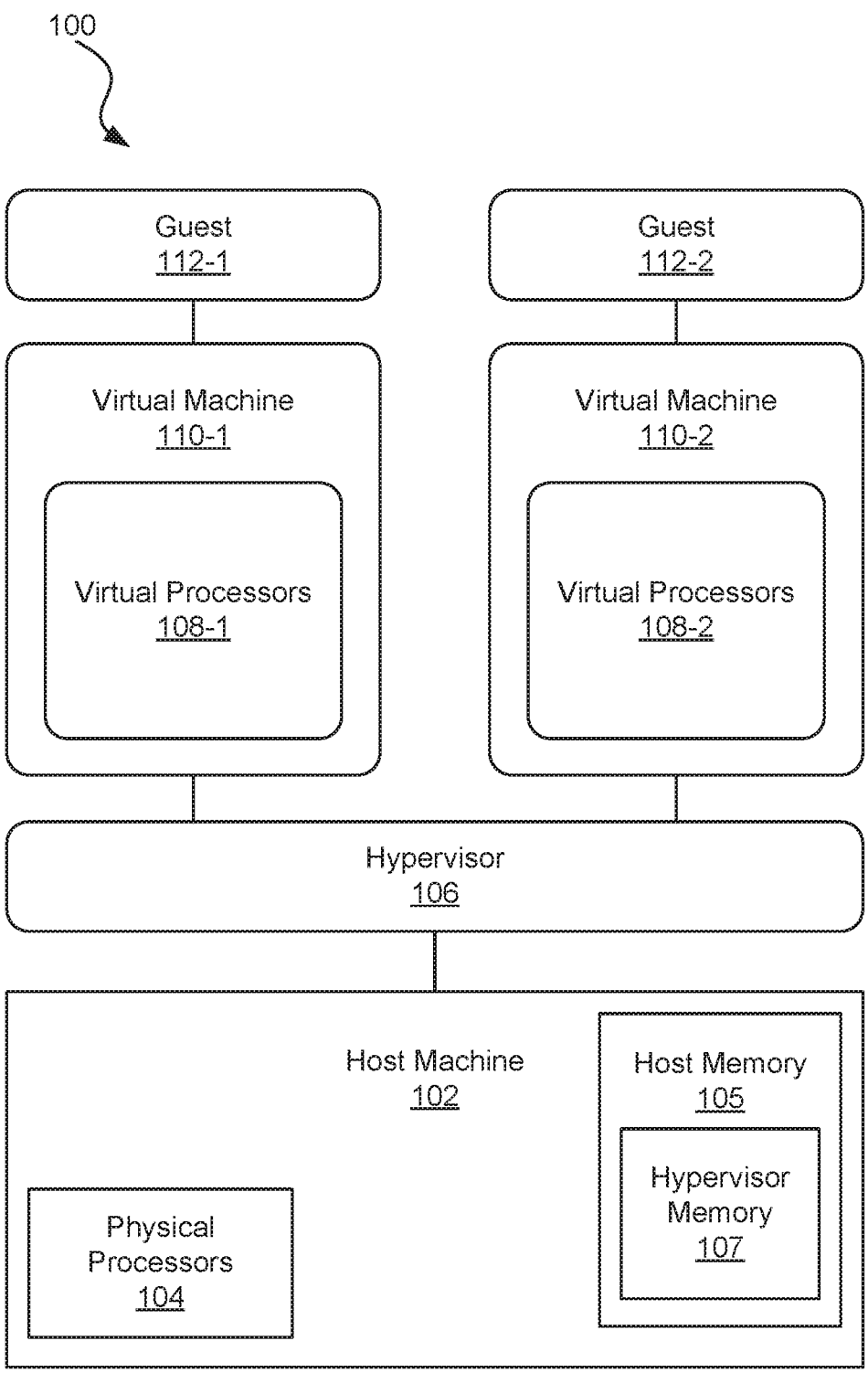
FIG. 1 is a diagram showing an illustrative host system running a plurality of virtual machines capable of using a paravirtualized cluster mode, according to one example of principles described herein.

In the figures, elements having the same designations have the same or similar functions.

DETAILED DESCRIPTION

In the following description, specific details are set forth describing some embodiments consistent with the present disclosure. It will be apparent, however, to one skilled in the art that some embodiments may be practiced without some or all of these specific details. The specific embodiments disclosed herein are meant to be illustrative but not limiting. One skilled in the art may realize other elements that, although not specifically described here, are within the scope and the spirit of this disclosure. In addition, to avoid unnecessary repetition, one or more features shown and described in association with one embodiment may be incorporated into other embodiments unless specifically described otherwise or if the one or more features would make an embodiment non-functional.

As described above, it is desirable to improve the manner in which virtual machines are managed. Like a physical machine, virtual machines may include a number of processor cores, which will be referred to as virtual cores. During operations, virtual processors receive interrupt signals. An interrupt is a signal generated by a device to indicate the need of attention from a central processing unit (CPU) and/or its operating system. When a CPU core receives the interrupt, the CPU core saves its state of execution and begins execution of the interrupt handler.

Interrupt signals are typically managed by an interrupt controller. Interrupt controllers have become more advanced over time. An earlier version of an interrupt controller is referred to simply as a Programmable Interrupt Controller (PIC), which could only interrupt one CPU at a time. Next, the Advanced Programmable Interrupt Controller (APIC) was developed, which was integrated into the CPU core. The APIC was followed by the xAPIC, which in turn is followed by the more advanced x2APIC. The x2APIC has an increased size of the registers and allows for flexibility in addressing multiple CPU cores. While many modern operating guest operating systems operate using x2APIC, sometimes legacy operating systems use the older xAPIC mode.

However, when using the older xAPIC mode, it would be desirable to still have flexibility to address multiple CPUs.

Addressing multiple CPU cores may be done in different ways. One method is called physical destination mode. Physical destination mode requires the interrupt to specify the exact CPU core where the interrupt should be delivered. Physical destination mode does not account for the number of pending interrupts currently at the CPU core waiting to be accepted, nor does it allow for balancing the workload among multiple CPU cores. Another method for addressing multiple CPU cores is referred to as logical destination mode. Logical destination mode accounts for the deficiencies of physical destination mode by allowing designation of a group of CPU cores as the delivery destination for an interrupt. The group of CPU cores can then arbitrate among themselves to determine which CPU core will accept the interrupt.

In logical destination mode, designation of a group of CPU cores is achieved through a logical Advanced Programmable Interrupt Controller (APIC) identification number (ID). The logical APIC ID is stored in the Logical Destination Register (LDR), and the local APIC associated with the CPU core checks to see if the delivery destination matches the logical APIC ID stored in its LDR. If it does, the CPU core can accept the interrupt. The logical APIC ID is the same in all CPU cores within a group. Therefore, by designating the logical APIC ID as the delivery destination, logical destination mode allows for easily designating a group of CPU cores. Logical destination mode also allows for assigning only one CPU core to each logical APIC ID; this is the standard method of assigning logical APIC IDs in, for example, 32-bit Linux kernel.

With conventional logical destination mode handling techniques, each core is associated with a particular bit of an eight-bit value. For example, CPU 0 may be associated with the value 00000001, CPU 1 may be associated with the value 00000010, CPU 2 may be associated with the value 00000100, etc. Thus, to specify a group of CPUs may be done by using an APIC ID of 10110101. In such case, each CPU may perform an AND operation with the APIC ID and its associated value and if the result is 1, then that CPU can choose to accept the interrupt.

Using this technique, a virtual machine using logical destination mode cannot accommodate more than eight logical APIC IDs. Thus, in situations that use this technique, such as when a legacy operating system that uses the xAPIC mode is loaded onto a guest, and there are more than eight processors, then logical destination mode can be used but the guest has to assign more than one CPU to have the same logical APIC ID. This is less desirable because the guest kernel has additional overhead as it has to take into account this fact when setting the destination register.

Using principles described herein, a legacy guest operating system that uses that xAPIC mode can still have the flexibility to address more than eight CPU cores without having to assign more than one CPU to the same logical APIC ID. To allow for guest virtual machines with greater than eight CPU cores to boot in logical destination mode with an xAPIC, the hypervisor advertises a paravirtualized cluster mode to a guest, which allows for interrupts using logical destination mode on a virtual machine with more than eight virtual cores. Each of the virtual cores are associated with an N-bit identifier formatted to be one of $2^N$ different values. In other words, it uses a binary representation rather than the individual-bit representation described above. When the hypervisor receives an interrupt for the virtual machine, the hypervisor determines which virtual core to send the interrupt to based on the destination address of the interrupt. By reading an identifier in traditional binary, the hypervisor has the ability to deliver interrupts to an increased number of CPU cores in logical destination mode. Additionally, using paravirtualization to provide the cluster mode allows for increased support of multiple CPU cores without having to make architectural changes to register sizes. This allows the computing system additional flexibility and improves operating efficiency.

FIG. 1 is a diagram showing an illustrative host system 100 running a plurality of virtual machines 110 capable of using a paravirtualized cluster mode, according to one example of principles described herein. According to the present example, a physical system, such as a host machine 102 includes hardware such as a set of processors 104 and a memory 105. The system 100 also includes a hypervisor 106. The hypervisor 106 supports a first virtual machine 110-1 and a second virtual machine 110-2. Although two virtual machines 110 are illustrated, other examples including fewer than two virtual machines 110 or more than two virtual machines 110 are within the scope of the present disclosure. The virtual machines 110 provide the guest operating systems 112 with a virtual platform on which to operate.

The hypervisor 106 allows for multiple virtual machines 110, and thus multiple guests 112, to run on the same physical host machine 102. Additionally, the host machine 102 may run the multiple guests 112 concurrently and in isolation from other programs on the host machine 102. One guest 112-1 may run a different type of operating system than another guest 112-2 being run on the same host machine 102. Additionally, the operating system associated with a guest 112 running on a virtual machine 110 may be different from the host operating system running on the host machine 102.

A guest 112 may include anything executed on a virtual machine 110-1. For example, a guest 112 may include an operating system, applications running on that operating system, data storage associated with the applications and operating system, drivers, etc. In one example, a guest 112-1 may be packaged as a large set of data that is loaded into host memory 105. The hypervisor 106 then interacts with that large set of data to execute instructions on one of the virtual machines 110.

The host memory 105 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software and data. The host memory 105 may designate various blocks of memory for use by the hypervisor 106 or for use by the virtual machines 110. Such designated blocks of memory are referred to as hypervisor memory 107. These blocks of memory may be ranges of physical memory addresses or virtual memory addresses.

The host machine 102 also includes a processor 104 for executing software (e.g., machine readable instructions) and using or updating data stored in memory 105. The software may include an operating system, the hypervisor 106 and various other software applications. The processor 104 may include one or more processors acting in concert.

In the example illustrated in FIG. 1, virtual machines 110 are platforms on which the guests 112 run. The virtual machines 110 include virtual processors 108 which are designed to appear to the guests 112 as physical processors. The hypervisor 106 manages the host machine 102 resources and makes them available to one or more guests 112 that alternately execute on the same hardware. The hypervisor 106 manages hardware resources and arbitrates requests of the multiple guests 112. In an example, the hypervisor 106 presents a virtual machine 110 that includes a virtual set of Central Processing Unit (CPU), memory, I/O, and disk resources to each guest 112 either based on the actual physical hardware or based on a standard and consistent selection of custom hardware. A virtual machine 110 has its own address space in memory, its own processor resource allocation, and its own device input/output (I/O) using its own virtual device drivers.

The hypervisor 106 can map a virtual resource or state (e.g., registers, memory, or files) to real resources in the underlying host machine 102. For example, the hypervisor 106 may present a guest memory to guest 112-1. The hypervisor 106 may map the memory locations of guest memory to physical memory locations of memory 105.

Figure 2:
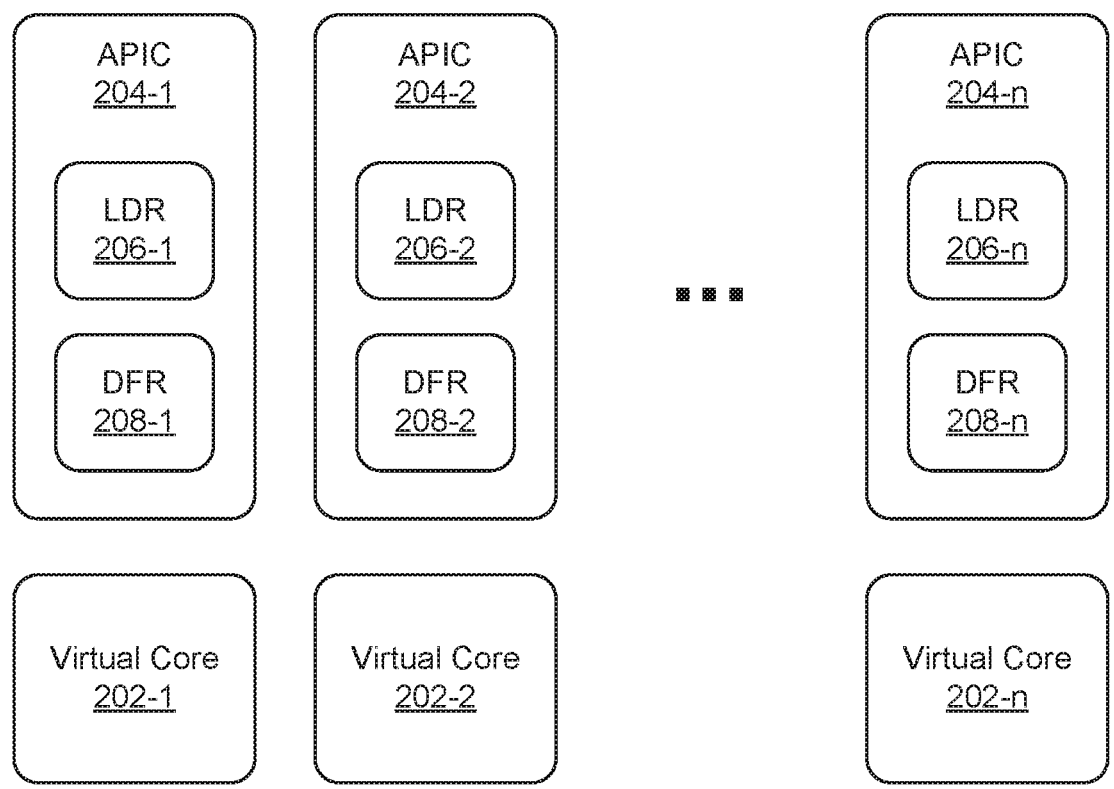
FIG. 2 is a diagram showing illustrative virtual cores that are able to use logical destination mode when there are more than eight virtual cores, according to one example of principles described herein.

FIG. 2 is a diagram showing illustrative virtual cores 202 that are able to use logical destination mode when there are more than eight virtual cores 202, according to one example of principles described herein. According to the present example, the system has multiple virtual cores 202. A system may have anywhere between one and N virtual cores 202. Each virtual core 202 has an Advanced Programmable Interrupt Controller (APIC) 204 associated with it. Within each APIC 204 is a Logical Destination Register (LDR) 206 and a Destination Format Register (DFR) 208.

A virtual core 202 is a virtual processor. Each of the virtual cores 202-1 through 202-n may correspond to the virtual processors 108-1 on virtual machine 110-1. Each of the virtual machines 110 contains virtual processors 108 that are a set of virtual cores 202-1 through 202-n. Software running by the guest is processed by the virtual cores 202. Each of the virtual cores 202-1 through 202-n has associated with it an APIC 204.

An APIC 204 is a programmable interrupt controller (PIC) that receives interrupt requests 302 and provides interrupt outputs according to programmable procedures or priorities. Local APICs 204 are used in processors, such as the virtual cores 202. Processor packages, such as virtual processors 108-1 may include more than one CPU core, such as the virtual cores 202. In a multi-processor computer system, interrupts may be processed by one or more APICs 204, including one local APIC 204 per virtual core 202 and one or more I/O APICs (not shown). An APIC 204 may be integrated within a virtual core 202 or may be provided by a separate component.

According to the present example, APIC 204 may be an xAPIC. An xAPIC is a newer, extended APIC, which is similar to early APICs but with some additional features. An xAPIC has 32 bits. An x2APIC is a newer, extended xAPIC, which includes further extensions and additional features. An x2APIC has 54 bits. A legacy operating system is an operating system no longer widely used or that has been replaced by an updated version of technology. Legacy operating systems may attempt to boot in the older, less robust xAPIC mode. When a guest 112 attempts to boot in xAPIC mode, rather than the more modern x2APIC mode, the logical destination mode interrupt delivery may only accommodate eight groups of virtual cores 202.

Figure 3:
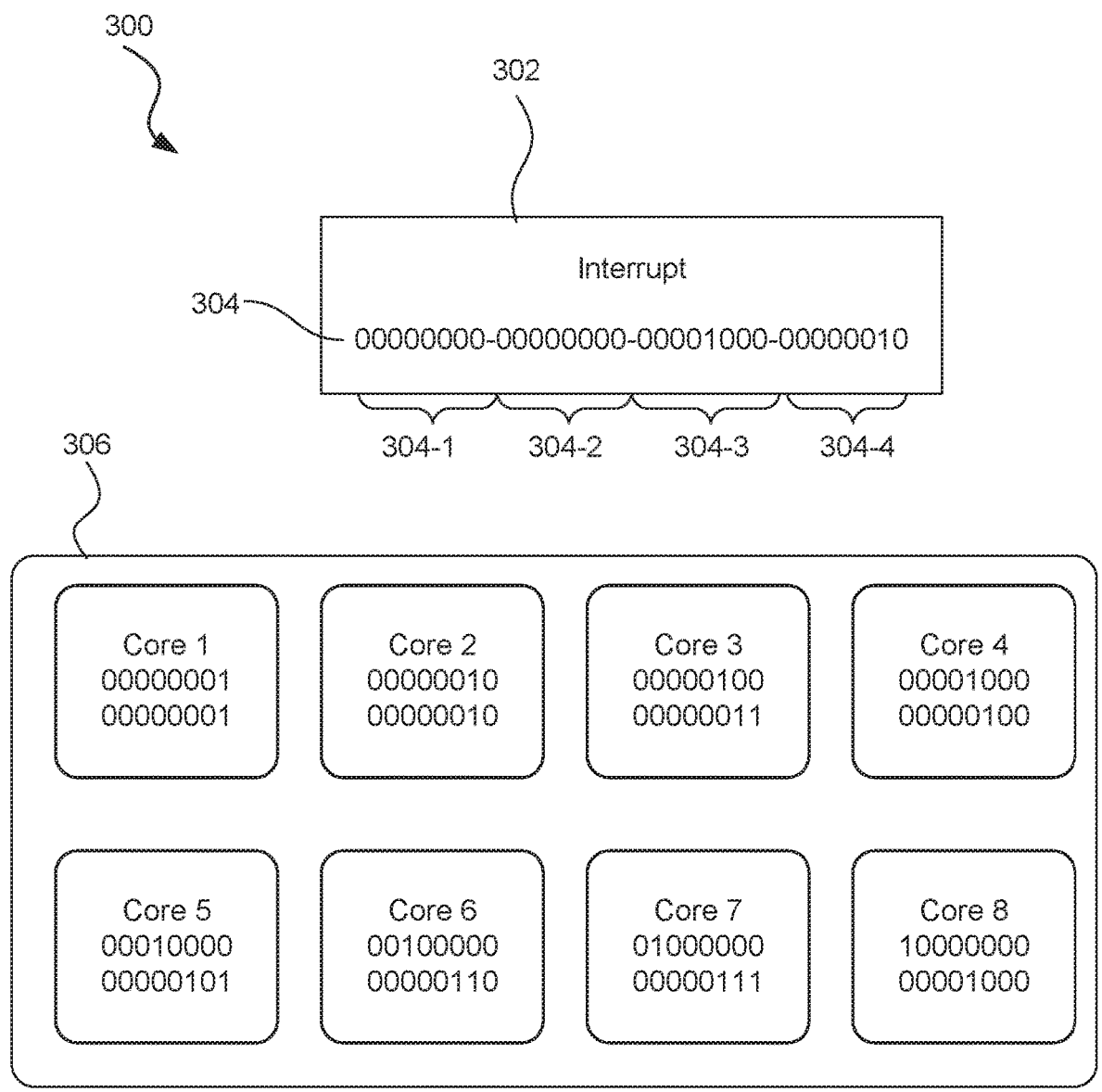
FIG. 3 is a diagram showing an interrupt request using a paravirtualized cluster mode, according to one example of principles described herein.

An LDR 206 includes a logical APIC identification number (ID) for the virtual core 202 it is paired with. Each LDR 206 is unique to each APIC 204 and virtual core 202. An interrupt may be addressed to any subset of CPU cores, including virtual cores 202. When an interrupt request 302 is sent (as shown in FIG. 3), it specifies a destination using either physical or logical destination mode. In physical destination mode, the destination CPU core may be specified by the identifier of the corresponding local APIC 204. A single CPU core, in this example a virtual core 202, may be addressed in the physical destination mode. The number of destination CPU cores may be increased by using logical destination mode. In logical destination mode, the destination CPU core is identified by a destination address 304. Each local APIC 204 checks to see if the destination address 304 matches the logical APIC ID in the associated LDR 206. If it does, the virtual core 202 may accept the interrupt. The LDR 206 may be a virtual representation of the physical LDR. For example, the guest may read or write to the LDR 206 as if it is reading or writing to the real APIC.

When using logical destination mode, the destination address 304 is interpreted depending upon the destination model programmed by the contents of the DFR 208. Conventionally, there are two destination models: flat mode and cluster mode. In order to use flat mode, bits 28-31 of the DFR 208 are programmed to ones. In flat mode, a unique local APIC identifier may be established for up to eight local APICs 204 by assigning a different bit in the logical APIC ID field of the LDR 206 to each local APIC 204. A group of local APICs 204 may then be selected by programming the corresponding bits in the destination address. The local APICs then check to see if the CPU core's assigned bit indicates a one. If it does, the CPU core may accept the interrupt. An interrupt request may be sent to all eight local APICs 204 by programming all bits in the destination address to ones. By contrast, cluster mode can handle more than eight CPU cores; however, it requires specific hardware that not every host has. If a host has the specific hardware, cluster mode is activated by programming bits 28-31 of the DFR 208 to zeros.

According to principles described herein, the host may not have the specific hardware. Regardless of whether the host has the specific hardware, a paravirtualized cluster mode is enabled by programming bits 28-31 of the DFR 208 to zeros. In cluster mode, two basic destination schemes may be supported: flat cluster and hierarchical cluster. In the flat cluster scheme, the destination address includes several bits at pre-defined positions encoding an address of the destination cluster and several bits at pre-defined positions identifying one or more APICs within the cluster. In the hierarchical cluster scheme, a hierarchical network may be created by connecting different flat clusters.

FIG. 3 is a diagram showing an interrupt request 302 using a paravirtualized cluster mode. According to the present example, the interrupt request 302 includes a destination address 304. The destination address 304 is comprised of four octets 304-1, 304-2, 304-3, and 304-4, which are eight-bit identifiers. According to the present example, the system has a plurality of virtual cores 306.

In each of the plurality of virtual cores 306, there is an eight-bit identifier indicating the legacy LDR and the paravirtualized LDR. For example, in Core 1, the legacy LDR is "00000001." Each of the legacy LDRs for each of the plurality of virtual cores 306 is assigned a different bit in the eight-bit identifier. The assigned bit indicates a one value to designate the assigned virtual core is to receive the interrupt. If an interrupt is targeted at multiple virtual cores 306, then the assigned bits for each of the targeted virtual cores will be set to ones. As an example, if Cores 1 and 2 are targeted, the identifier will read "00000011." However, since the identifier is only eight bits, only eight virtual cores can be accommodated. This is problematic for systems with more than eight virtual cores.

The paravirtualized LDR is different from the legacy LDR. The paravirtualized LDR is interpreted by the hypervisor 106 and the guest 112 in traditional binary. Thus, the paravirtualized LDR in Core 1 is also "00000001," which is one in binary, but the paravirtualized LDR in Core 3 is "00000011," which is three in binary. The host hardware allows for setting multiple bits to ones, which can be seen in the example above where Cores 1 and 2 were targeted using the legacy LDR. Therefore, by using traditional binary in the paravirtualized LDR, 255 virtual cores 202 can be designated. This is because there are 255 numbers that can be accounted for in a binary reading of eight bits.

The destination address 304 of the interrupt request 302 can be written in traditional binary so that the hypervisor 106 can interpret the destination address 304 and compare it with the paravirtualized LDR in each of the plurality of virtual cores 306. Because the destination address 304, according to the present example comprises four octets 304-1, 304-2, 304-3, and 304-4, the interrupt request 302 may specify four different virtual cores 202 in the plurality of virtual cores 306 that should receive the interrupt. This allows an interrupt to identify up to four different virtual cores that may process the interrupt. In order to specify more than four virtual cores 202, the paravirtualized LDR of multiple virtual cores 202 can be changed to reflect the same identifier.

Figure 4:
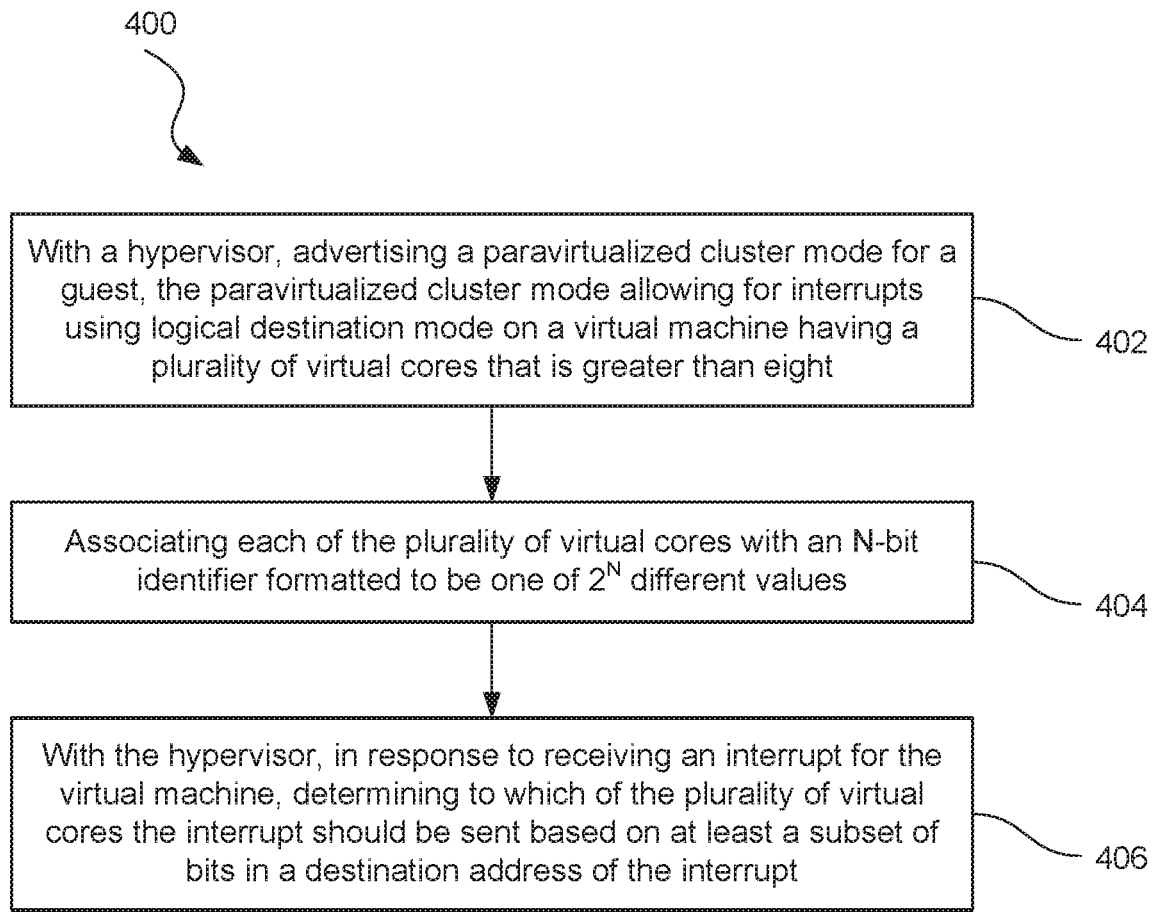
FIG. 4 is a flowchart showing an illustrative method for a hypervisor to use a paravirtualized cluster mode, according to one example of principles described herein.

FIG. 4 is a flowchart showing an illustrative method 400 for a hypervisor 106 to use a paravirtualized cluster mode, according to one example of principles described herein. According to the present example, the method 400 includes a process 402 at which the hypervisor 106 advertises a paravirtualized cluster mode for a guest 112. The paravirtualized cluster mode allows for interrupts using logical destination mode on a virtual machine 110 having a plurality of virtual cores 306 that is greater than eight. The hypervisor 106 may advertise the paravirtualized cluster mode in a Central Processing Unit Identifier (CPUID) bit. The CPUID bits are used to advertise characteristics and details of a processor. The guest 112 may or may not check for support of the paravirtualized cluster mode. If the hypervisor 106 advertises the support, and the guest 112 does discover it, the method 400 proceeds to process 404.

The method 400 further includes a process 404 for associating each of the plurality of virtual cores 306 with an N-bit identifier formatted to be one of $2^N$ different values. In the present example, the identifier represents a value in traditional binary. In certain examples, the identifier is the logical APIC ID set in bits 24-31 in the LDR 206 of a virtual core 202. In certain examples, N equals eight. If the virtual cores 202 are associated with the identifiers, the method 400 proceeds to process 406.

The method 400 further includes a process 406 at which the hypervisor 106, in response to receiving an interrupt for the virtual machine 110, determines to which of the plurality of virtual cores 306 the interrupt should be sent based on at least a subset of bits in a destination address 304 of the interrupt. In the present example, the hypervisor 106 interprets the bits in the destination address 304 according to traditional binary. The binary number that the bits indicate should match an identifier in at least one of the virtual cores 202. In certain examples, the destination address 304 is a 32-bit address and the subset of bits is eight bits. Additionally, the destination address 304 may include up to four different possible destinations for the interrupt by using four subsets of eight bits, totaling 32 bits. If the interrupt is to be sent to more than four destinations, the guest 112 may set two LDRs 206 associated with two different virtual cores 202 to have the same value. In certain examples, the identifier is the logical APIC ID set in the LDR 206 of a virtual core 202.

Figure 5:
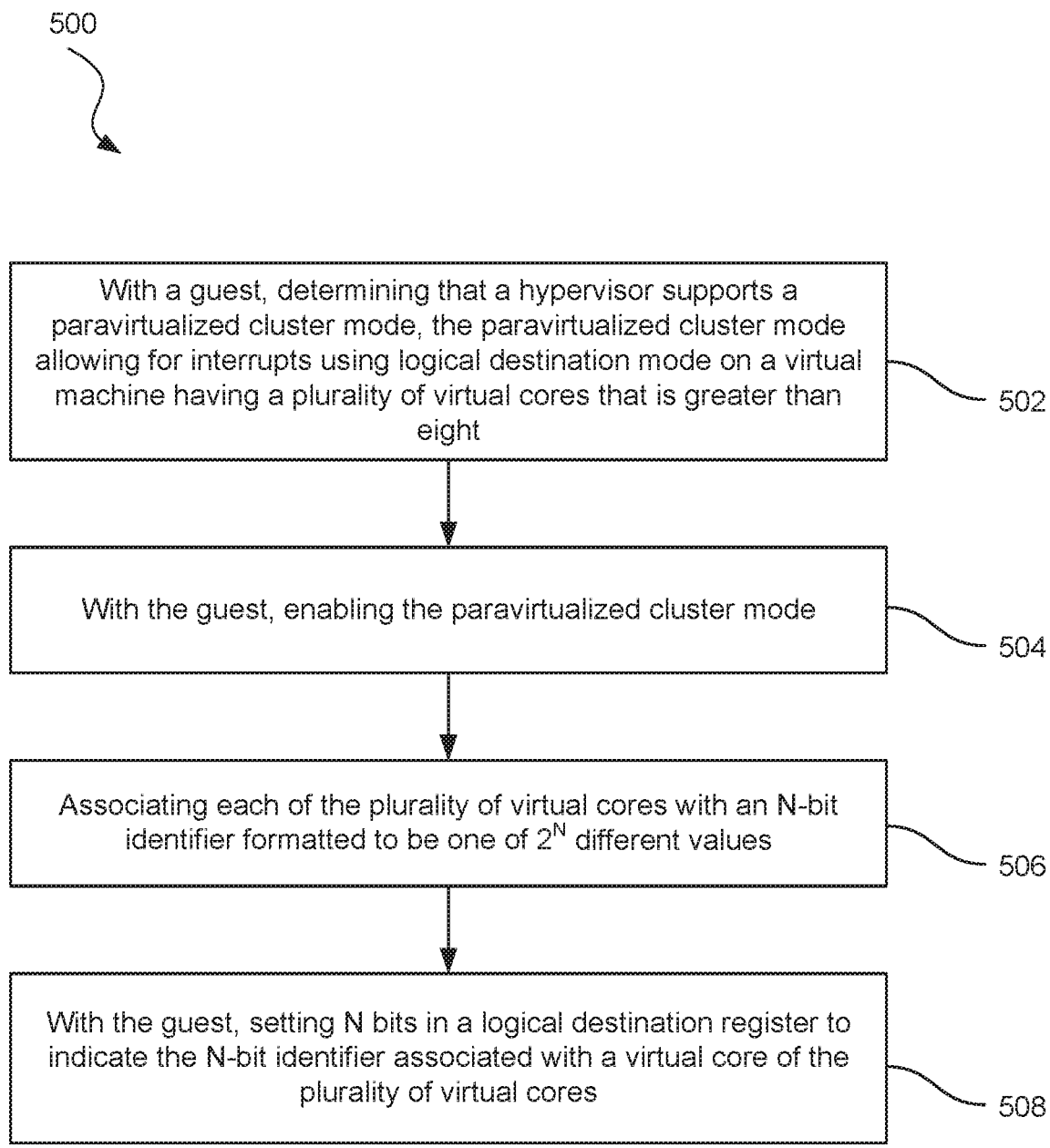
FIG. 5 is a flowchart showing an illustrative method for a guest to use a paravirtualized cluster mode, according to one example of principles described herein.

FIG. 5 is a flowchart showing an illustrative method 500 for a guest 112 to use a paravirtualized cluster mode, according to one example of principles described herein. According to the present example, the method 500 includes a process 502 at which the guest 112 determines whether a hypervisor 106 supports a paravirtualized cluster mode. The paravirtualized cluster mode allows for interrupts using logical destination mode on a virtual machine 110 having a plurality of virtual cores 306 that is greater than eight. The guest 112 may check for support with a CPUID instruction. A CPUID instruction allows operating systems to learn the characteristics and details of a processor. The hypervisor 106 may or may not advertise support of the paravirtualized cluster mode. If the hypervisor 106 does advertise the support and the guest 112 discovers it, the method 500 proceeds to process 504.

The method 500 further includes a process 504 at which the guest 112 enables the paravirtualized cluster mode. In certain examples, the guest 112 enables the paravirtualized cluster mode by writing zeros to bits 2-31 of the DFR 208. This is the same step that usually is required to enable cluster mode in hosts 102 with the required specific hardware, but the paravirtualization setup that follows is different. If the guest 112 enables the paravirtualized cluster mode, the method 500 proceeds to process 506.

The method 500 further includes a process 506 for associating each of the plurality of virtual cores 306 with an N-bit identifier formatted to be one of $2^N$ different values. In certain examples, the identifier represents a value in traditional binary. In certain examples, the identifier is the logical APIC ID set in bits 24-31 in the LDR 206 of a virtual core 202. In certain examples, N equals eight. If the virtual cores 202 are associated with the identifiers, the method 500 proceeds to process 508.

The method 500 further includes a process 508 at which the guest 112 sets N bits in a logical destination register 206 to indicate the N-bit identifier associated with a virtual core 202 of the plurality of virtual cores 306. In certain examples, the guest 112 programs bits 24-31 of the LDR 206 with the identifier by setting appropriate bits that represent the actual number represented in traditional binary, rather than simply setting a single assigned bit associated with the virtual core 202. In certain examples, the destination address 304 is a 32-bit address and the subset of bits is eight bits. Additionally, the destination address 304 may contain up to four different possible destinations for the interrupt by using four subsets of eight bits, totaling 32 bits. If the interrupt is to be sent to more than four destinations, the guest 112 may set two LDRs 206 associated with two different virtual cores 202 to have the same value. In certain examples, the identifier is the logical APIC ID.

Some examples of processing systems described herein may include non-transient, tangible, machine readable media that include executable code that when run by one or more processors (e.g., processor 104) may cause the one or more processors to perform the processes of the methods described above. Some common forms of machine readable media that may include the processes of the methods are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Although illustrative embodiments have been shown and described, a wide range of modification, change and substitution is contemplated in the foregoing disclosure and in some instances, some features of the embodiments may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the embodiments disclosed herein.

What is claimed is:

1. A method comprising:
with a hypervisor, advertising a paravirtualized cluster mode for a guest using a legacy Advanced Programmable Interrupt Controller (APIC), the paravirtualized cluster mode allowing for interrupts using logical destination mode on a virtual machine having a plurality of virtual cores that is greater than eight, the logical destination mode allowing for designation of a group of the plurality of virtual cores as a delivery destination for an interrupt;
associating each of the plurality of virtual cores with an N-bit identifier formatted to be one of $2^N$ different values; and
with the hypervisor, in response to receiving an interrupt for the virtual machine, determining to which of the plurality of virtual cores the interrupt should be sent based on at least a subset of bits in a destination address of the interrupt.

2. The method of claim 1, wherein the hypervisor advertises the paravirtualized cluster mode via a Central Processing Unit Identifier (CPUID) bit.

3. The method of claim 2, further comprising, with the guest, checking for support of the paravirtualized cluster mode by using a CPUID instruction.

4. The method of claim 1, further comprising, with the guest, enabling the paravirtualized cluster mode by writing zeros to bits 28-31 of a destination format register.

5. The method of claim 1, where N equals eight.

6. The method of claim 1, wherein the N-bit identifier is represented by bits 24-31 of a logical destination register.

7. The method of claim 1, wherein the destination address is a 32-bit address and the subset of bits is eight bits.

8. The method of claim 7, wherein the destination address specifies up to four different possible destinations for the interrupt.

9. The method of claim 7, wherein to send the interrupt to more than four different possible destinations, the guest sets two logical destination registers associated with two different virtual cores of the plurality of virtual cores to have a same value.

10. A method comprising:
with a guest using a legacy Advanced Programmable Interrupt Controller (APIC), determining that a hypervisor supports a paravirtualized cluster mode, the paravirtualized cluster mode allowing for interrupts using logical destination mode on a virtual machine having a plurality of virtual cores that is greater than eight, the logical destination mode allowing for designation of a group of the plurality of virtual cores as a delivery destination for an interrupt;
with the guest, enabling the paravirtualized cluster mode;
associating each of the plurality of virtual cores with an N-bit identifier formatted to be one of $2^N$ different values; and
with the guest, setting N bits in a logical destination register to indicate the N-bit identifier associated with a virtual core of the plurality of virtual cores.

11. The method of claim 10, wherein enabling the paravirtualized cluster mode comprises writing zeros to bits 28-31 of a destination format register.

12. The method of claim 10, wherein determining whether the hypervisor supports the paravirtualized cluster mode comprises the guest checking a Central Processing Unit Identifier (CPUID) instruction.

13. The method of claim 10, where N equals eight.

14. The method of claim 10, wherein the N-bit identifier is represented by bits 24-31 of the logical destination register.

15. The method of claim 10, further comprising, with the guest, processing an interrupt with a destination address, wherein the destination address is a 32-bit address.

16. The method of claim 15, wherein the destination address specifies up to four different possible destinations for the interrupt.

17. The method of claim 15, wherein to send the interrupt to more than four different possible destinations, the guest sets N bits in two logical destination registers associated with two different virtual cores of the plurality of virtual cores to have a same N-bit identifier.

18. A computing system comprising:
a processor; and
a memory comprising machine readable instructions that when executed by the processor, cause the system to:
advertise a paravirtualized cluster mode for a guest using a legacy Advanced Programmable Interrupt Controller (APIC), the paravirtualized cluster mode allowing for interrupts using logical destination mode on a virtual machine having a plurality of virtual cores that is greater than eight, the logical destination mode allowing for designation of a group of the plurality of virtual cores as a delivery destination for an interrupt;
associate each of the plurality of virtual cores with an N-bit identifier formatted to be one of 2N different values; and
in response to receiving an interrupt for the virtual machine, determine to which of the plurality of virtual cores the interrupt should be sent based on at least a subset of bits in a destination address of the interrupt.

19. The system of claim 18, wherein a hypervisor advertises the paravirtualized cluster mode via a Central Processing Unit Identifier (CPUID) bit.

20. The system of claim 18, wherein the destination address is a 32-bit address and the subset of bits is eight bits.

* * * * *